(12) United States Patent
Takada et al.

(10) Patent No.: US 8,234,447 B2
(45) Date of Patent: Jul. 31, 2012

(54) STORAGE CONTROL DEVICE FOR STORAGE SYSTEM PROVIDED WITH STORAGE DEVICE COUPLED TO SWITCH NETWORK

(75) Inventors: Aritoki Takada, Yokohama (JP); Ken Nomura, Yokohama (JP); Tadashi Takeuchi, Tokyo (JP); Damien Le Moal, Machida (JP); Hiroshi Mine, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 12/663,799

(22) PCT Filed: Oct. 9, 2009

(86) PCT No.: PCT/JP2009/005288
§ 371 (c)(1),
(2), (4) Date: Dec. 9, 2009

(87) PCT Pub. No.: WO2011/042939
PCT Pub. Date: Apr. 14, 2011

(65) Prior Publication Data
US 2011/0208910 A1 Aug. 25, 2011

(51) Int. Cl.
*G06F 12/08* (2006.01)
*G06F 12/16* (2006.01)

(52) U.S. Cl. .......... 711/114; 711/E12.019; 711/E12.103
(58) Field of Classification Search .................. 711/114, 711/E12.019, E12.103; 714/6.22
See application file for complete search history.

(56) References Cited

U.S. PATENT DOCUMENTS

| | | | |
|---|---|---|---|
| 5,996,014 A | 11/1999 | Uchihori et al. | |
| 2006/0069866 A1* | 3/2006 | Miyazaki | 711/114 |
| 2006/0253549 A1* | 11/2006 | Arakawa et al. | 709/217 |
| 2006/0271677 A1 | 11/2006 | Mercier | |
| 2007/0016746 A1* | 1/2007 | Kano | 711/165 |
| 2008/0209263 A1* | 8/2008 | Settle et al. | 714/6 |
| 2010/0077252 A1* | 3/2010 | Siewert et al. | 714/6 |

FOREIGN PATENT DOCUMENTS

| | | |
|---|---|---|
| EP | 1 845 451 | 10/2007 |
| EP | 1 847 921 | 10/2007 |
| JP | 10134485 | 5/1998 |

\* cited by examiner

*Primary Examiner* — Hal Schnee
(74) *Attorney, Agent, or Firm* — Brundidge & Stanger, P.C.

(57) ABSTRACT

A plurality of storage devices are coupled with at least two switch of a switch network that is configured by a plurality of switches that transfer a packet that complies with an IP (Internet Protocol). Moreover, a storage control device is coupled with the switch network. The storage control device builds an LU (Logical Unit) that is utilized by a host device based on at least two storage devices that are coupled with different switches.

5 Claims, 16 Drawing Sheets

| MANAGEMENT NUMBER 301 | PARENT NODE 302 | NODE NAME 303 | MTBF 304 | OPERATING TIME 305 | NETWORK INFORMATION 306 | DEVICE STATE 307 |
|---|---|---|---|---|---|---|
| 0 | - | CONTROL DEVICE #0 | 90000 HOURS | 3650 HOURS | RTT1 msec | NORMAL |
| 1 | 0 | SWITCH 0 | 10000 HOURS | 2184 HOURS | RTT1 msec | NORMAL |
| 2 | 1 | DRIVE A | 5000 HOURS | 765 HOURS | RTT2 msec | NORMAL |

300 NODE MANAGEMENT TABLE

Fig.7

| 311 | 312 | 313 | 314 | 315 | 316 |
|---|---|---|---|---|---|
| LU NUMBER | LU TYPE | CAPACITY | USED DRIVE | DRIVE REDUNDANCY | PATH REDUNDANCY |
| 0 | 2D1P | 4TB | B,C,D | 1/1 | 0/0 |
| 1 | 2D2P AUTOMATIC RECOVERY | 4TB | A,H,I,J | 2/2 | 0/0 |
| 2 | 2D+1P+1N | 4TB | G,Q,R | 1/1 | 1/1 |

310 LU MANAGEMENT TABLE

Fig.10

| LU NUMBER | LU TYPE | USED DRIVE |
|---|---|---|
| 0 | 2D1P | B,C,D |
| 1 | 2D1P+1N | A,H,D |
| NEW | 2D | G,Q |
| ... | | |

320

311 — LU NUMBER
312 — LU TYPE
314 — USED DRIVE

Fig.13

STORAGE CONTROL DEVICE FOR STORAGE SYSTEM PROVIDED WITH STORAGE DEVICE COUPLED TO SWITCH NETWORK

TECHNICAL FIELD

The present invention generally relates to a storage control for a storage system provided with a plurality of storage devices.

BACKGROUND ART

In general, to achieve a storage system having a large amount of capacity, it is necessary to configure a plurality of RAID (Redundant Array of Independent (or Inexpensive) Disks) groups composed of a large number of drives and generate one or more LUs (Logical Units) on each of the RAID groups. According to the PTL 1 for instance, a plurality of disk devices are coupled with a shared channel network and an element server accesses a disk device that is coupled with the shared channel network.

CITATION LIST

[Patent Literature]
[PTL 1]
Japanese Patent Application Laid-Open Publication No. 10-134485

SUMMARY OF INVENTION

[Technical Problems]

For a system in which all storage devices are coupled with a shared channel network, in the case in which a failure occurs in the shared channel network, the all storage devices cannot be accessed. To avoid the problem, it is necessary that the shared channel network is multiplexed. However, the multiplexing of the shared channel network causes a cost to be increased.

An object of the present invention is to suppress both of an increase in a cost and a reduction of availability.

[Solution to Problem]

A plurality of storage devices are coupled with at least two switches of a switch network composed of a plurality of switches that transfer a packet that complies with an IP (Internet Protocol), and a storage control device is coupled with the switch network.

The storage control device comprises an interface device that is coupled with at least one switch of the switch network and a controller that is coupled with the interface device. The controller builds an LU (Logical Unit) that is utilized by a host device based on at least two storage devices that are coupled with different switches.

The controller can be configured by a processor (for instance, a microprocessor) and a storage resource (for instance, a memory), and can have a hardware circuit. In other words, a processing that is executed by the controller can be executed by a processor that reads a computer program from a storage resource, and a part or the whole of the processing can be executed by a hardware circuit.

The storage device can be a physical storage device or a virtual storage device. An example of the storage device is a drive that will be described in the following embodiment.

[Advantageous Effects of Invention]

By the present invention, both of an increase in a cost and a reduction of availability can be suppressed.

BRIEF DESCRIPTION OF DRAWINGS

FIG. 7 is a view showing the configuration of a node management table 300.

FIG. 10 is a view showing the configuration of an LU management table 310.

FIG. 13 is a view for indicating the contents of the input parameter 320 to the redundancy calculation program 115.

DESCRIPTION OF EMBODIMENTS

A mode for the present invention will be described below in detail with reference to the drawings. In the following descriptions, an "I/O (Input/Output)" and an "access" have the same meaning.

Figure 1:
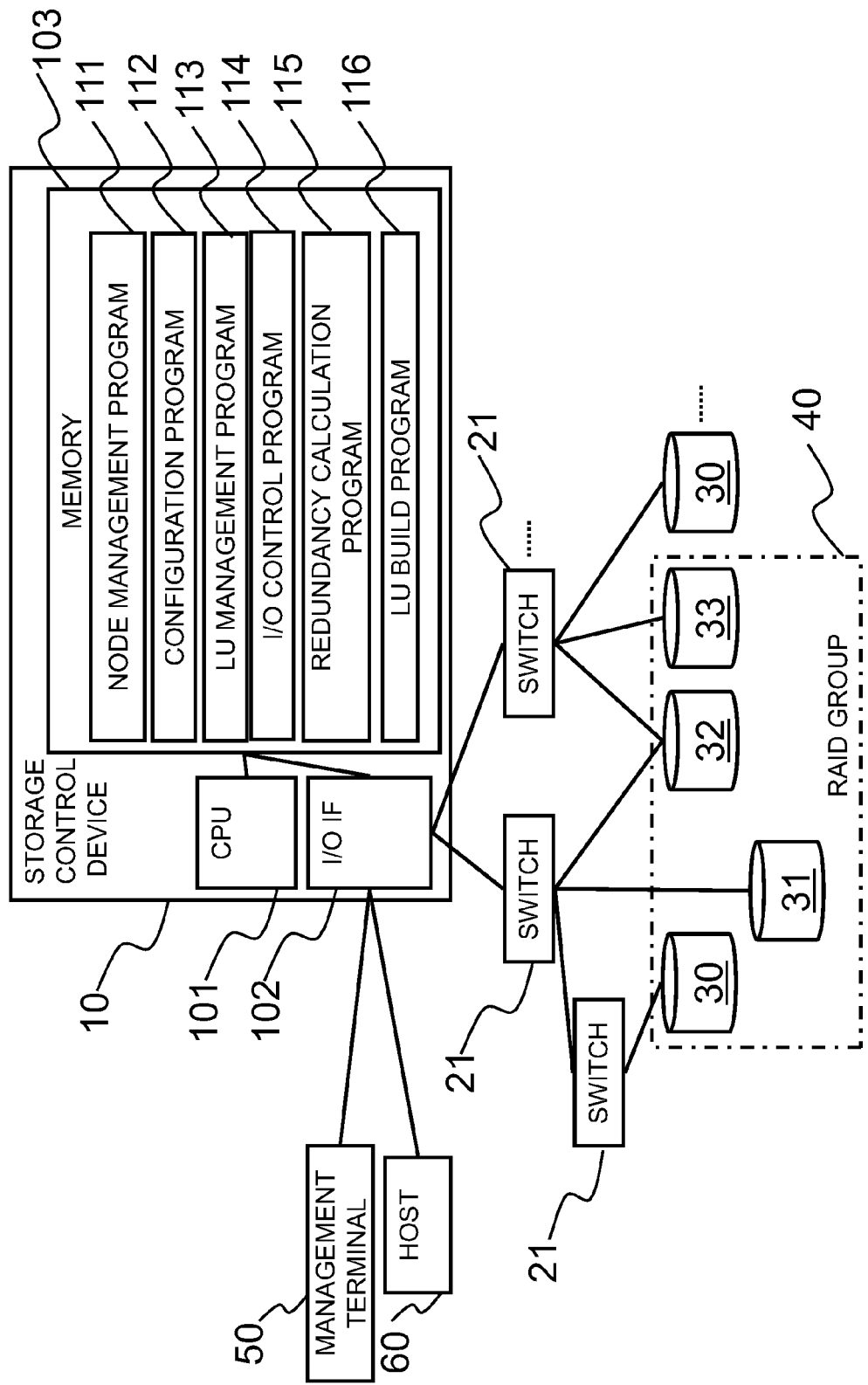
FIG. 1 is a view showing a computer system that includes a storage system in accordance with an embodiment of the present invention.

FIG. 1 is a view showing a computer system that includes a storage system in accordance with an embodiment of the present invention.

A computer system is provided with a management terminal 50, a host 60, and a storage system. The storage system is provided with a storage control device 10 that is coupled with a switch network and a plurality of physical storage devices (hereafter referred to as drives) that are coupled with the switch network.

The management terminal 50 is a terminal (for instance, a computer) that is coupled with the storage control device 10. The management terminal 50 transmits an indication for building a RAID group and an indication for building an LU (Logical Unit) on the RAID group to the storage control device 10. For instance, an indication for building one RAID group 40 by using drives 30 to 33 of a plurality of types is transmitted from the management terminal 50 to the storage control device 10. The RAID group 40 is built by the storage control device 10 responding to the indication. In the case in which a RAID level of the RAID group 40 is a RAID5, three drives of the drives 30 to 33 store the user data, and one drive of the drives 30 to 33 stores a parity data that has been acquired by a logical operation in which the user data has been used. Consequently, even in the case in which any drive of the drives 30 to 33 is broken down, the user data can be restored. The LU is generated based on the RAID group. For an embodiment in accordance with the present invention, a hard disk drive (HDD) (or a storage device provided with a plurality of HDDs) is written as a drive 30, a flash memory drive (or a storage device provided with a plurality of flash memory drives) is written as a drive 31, a JBOD (Just a Bunch Of Disks) is written as a drive 32, and a virtual drive is written as a drive 33, as described later. The drives 30 to 33 are only examples of types of drives. Other types of drives can also be adopted as substitute for a drive of at least one type of the drives 30 to 33.

The host 60 is a device (for instance, a server or another storage system) that utilizes the LU, and is coupled with the storage control device 10. The host 60 transmits an I/O request (a read request or a write request) that specifies the LU to the storage control device 10. By this configuration, the write and read of data from the host 60 to the LU is executed via the storage control device 10. The host 60 can be coupled with one of switches 21 of the switch network, and can execute the write and read of data to the LU without a mediated storage control device 10. In this case, the host 60 is coupled with the switch network without a mediated storage control device 10.

The switch network is provided with a plurality of switches 21. The switch 21 is a switch that transmits a packet that complies with an IP (Internet Protocol), and is an Ethernet switch for instance (Ethernet is a trademark of Xerox Corporation). Consequently, the switch network is a LAN (Local Area Network) or an IP network for instance. In the case in which the storage control device 10 is an upstream side and a drive is a downstream side, an upstream side node (a parent node) close to the switch 21 is another switch or the storage control device 10, and a downstream side node (a child node) close to the switch 21 is another switch or a drive. A plurality of drives can be coupled with one switch 21, and one drive can be coupled with a plurality of switches. Moreover, the storage control device 10 can be coupled with a plurality of switches. In FIG. 1, a tree structure is built. In the tree structure, a root node is the storage control device 10, a terminal node is a drive, and a relay node is the switch 21.

The storage control device 10 is a computer for instance, and is provided with a CPU (Central Processing Unit) 101, an I/O interface (I/O IF) 102, and a memory 103. The memory 103 stores a node management program 111, a configuration program 112, an LU management program 113, an I/O control program 114, a redundancy calculation program 115, and an LU build program 116. The programs 111 to 116 are executed by the CPU 101. A processing that is carried out by the CPU 101 executing any one of the programs 111 to 116 will be described in the following while a program that is executed by the CPU 101 is a nominative.

Figure 2:
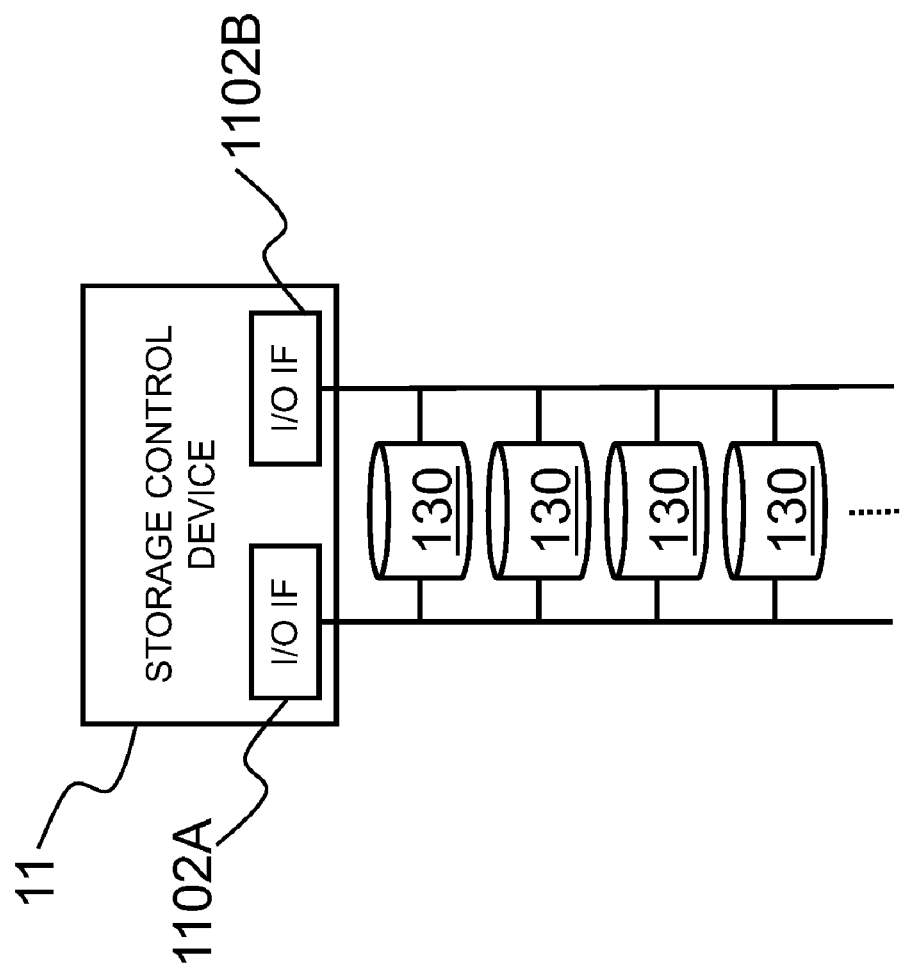
FIG. 2 is a view showing a configuration of a general storage system.

FIG. 2 is a view showing a configuration of a general storage system.

For a general storage system, a path from a storage control device 11 to each HDD 130 is duplicated. More specifically, all HDDs 130 are coupled with both of I/O interfaces 1102A and 1102B for instance. Consequently, even in the case in which one path is broken down, the HDD 130 can be accessed via the other path.

Figure 3:
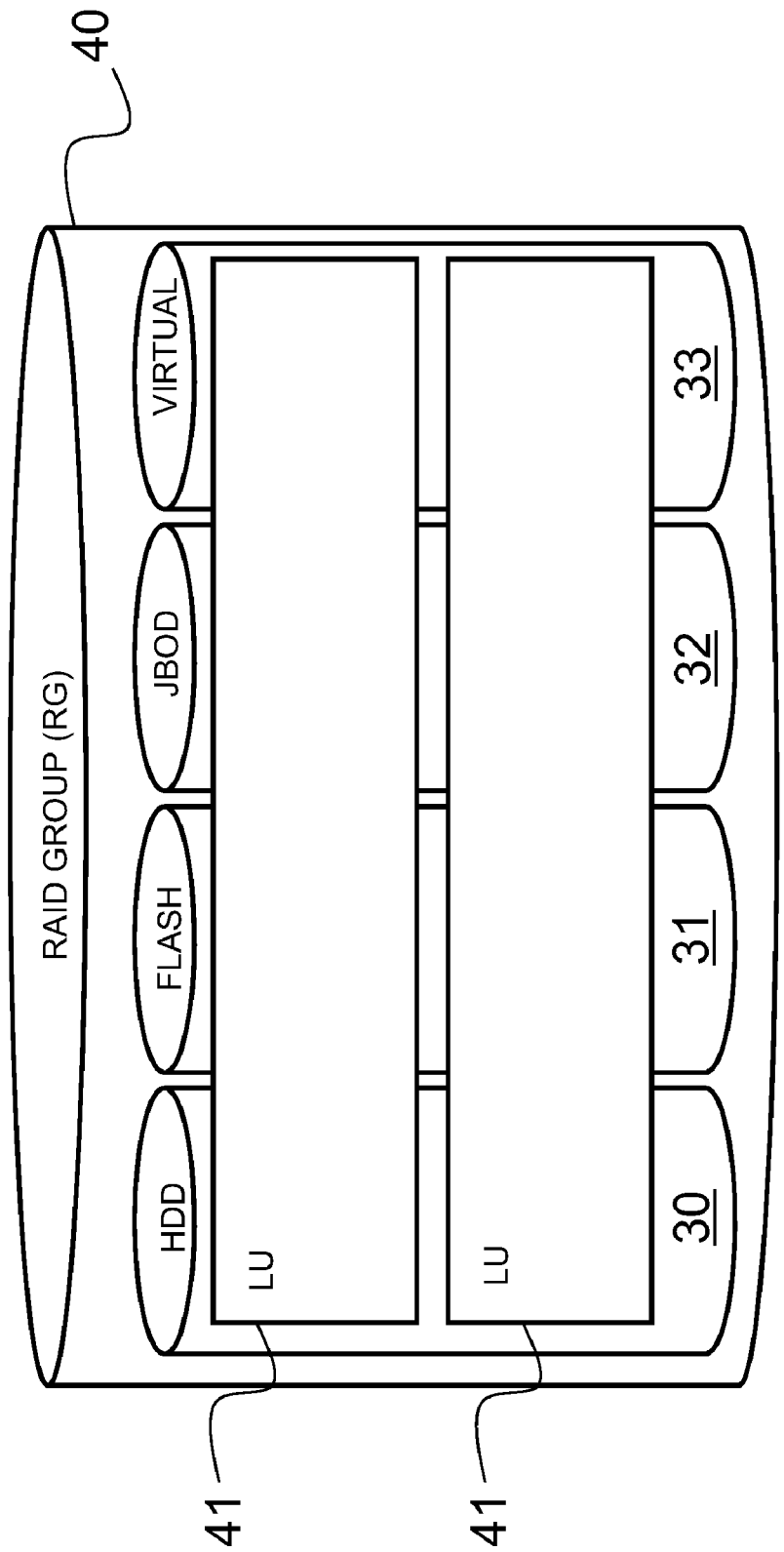
FIG. 3 is a view showing a relationship between the RAID group 40 and the LU in accordance with the present invention.

FIG. 3 is a view showing a relationship between the RAID group 40 and the LU in accordance with the present invention.

As described above, the RAID group 40 is configured by the drives 30 to 33. The drive is not restricted to a physically single drive, and can also be a drive that can be seen as a logically single drive, such as a memory drive 31, a JBOD (Just a Bunch Of Disks) 32, and a virtual drive 33.

A RAID level in which the parity data is stored into some drives that configure the RAID group can be adopted as a RAID level of the RAID group 40. For instance, a RAID5, in which the user data can restored even in the case in which one drive is broken down, and a RAID6, in which the user data can restored even in the case in which two drives are broken down, can be adopted as a RAID level.

A storage area (a logical drive) that has been logically built on the RAID group 40 is an LU 41. A plurality of LUs can be generated based on one RAID group. On the assumption that one RAID group includes only one LU, a RAID group is configured and an LU is configured on the RAID group. This configuration is referred to as "an LU is configured" in the following to simplify the descriptions.

Figure 4:
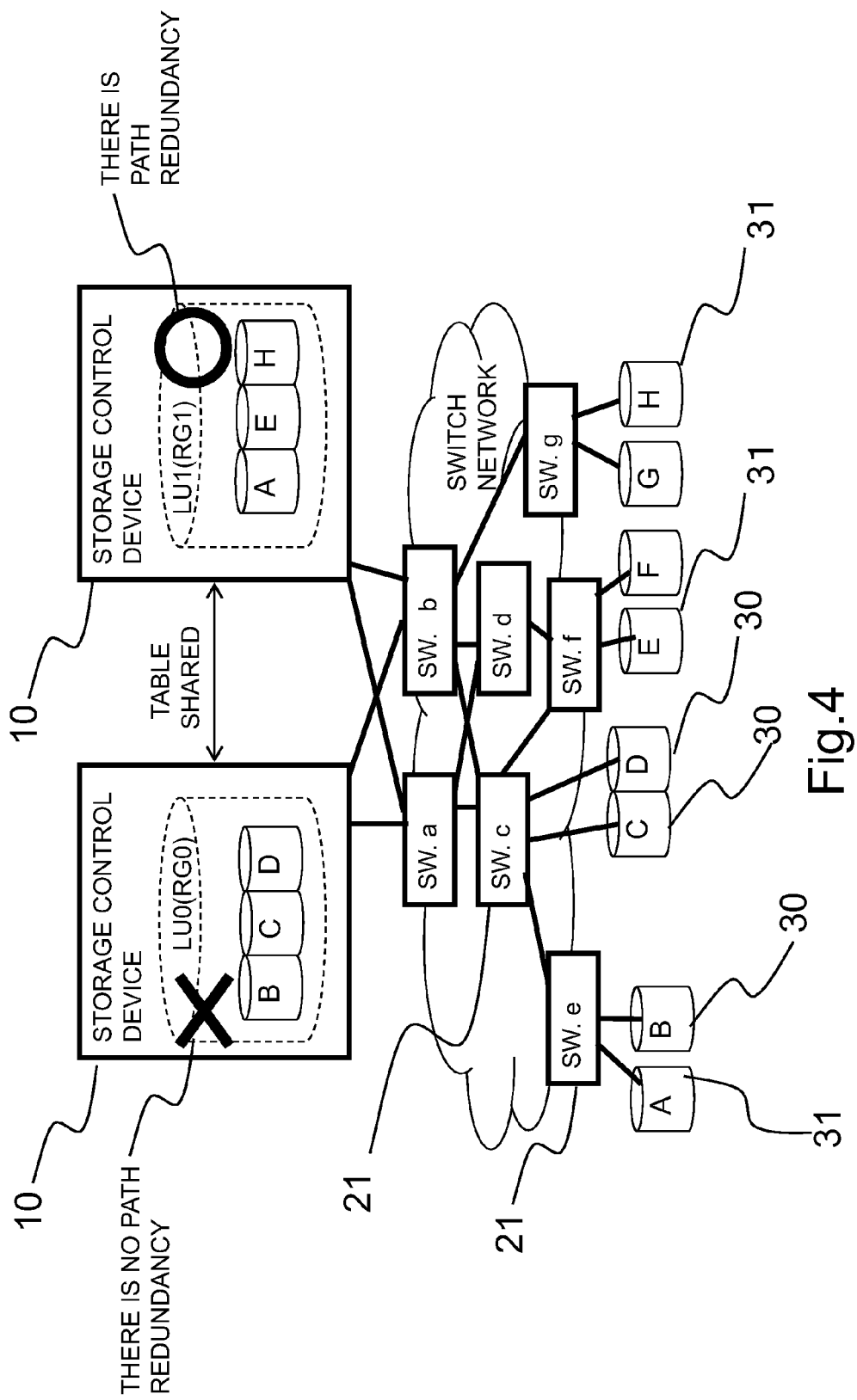
FIG. 4 is a schematic view for illustrating problems and a devise means of solving such problems.

Even in the case in which a RAID group is configured by at least two arbitrary drives of a plurality of drives that are coupled with a switch network, an LU based on the RAID group cannot be accessed due to a breakdown of a switch in some cases. More specifically, as shown in FIG. 4, an LU0 (a RAID group 0) of the RAID5 is built by using drives B, C, and D. In the case in which a switch c (SW. c) is broken down however, all of the drives B, C, and D cannot be accessed, whereby the LU0 cannot be accessed.

For an embodiment in accordance with the present invention, a devise means of solving such problems, that is, a devise means of preventing availability from being affected and damaged is adopted. The summary of the devise means will be described in the following.

That is to say, the CPU 101 of the storage control device 10 selects at least two drives that configure an LU (a RAID group) of an LU type from a plurality of unused drives that are coupled with the switch network (drives that are not a configuration element of any RAID group) based on a node management table that represents the tree structure described above (a structure from a root node to a terminal node) and the LU type (for instance, a RAID level of a RAID group that is a basis of the LU). More specifically, the CPU 101 determines at least two drives that configure an LU in such a manner that the number of drives that cannot be accessed among at least two drives that configure an LU (a RAID group) is equivalent to or less than a drive redundancy (the maximum number of drives for which a breakdown is permitted) that is represented by the LU type (for instance, a RAID level) even in the case in which any one of switches 21 of the switch network is broken down. For instance, in the case in which the LU type is "2D1P" (that is, three drives are required and a drive redundancy is 1), the CPU 101 selects three drives in which at least two drives of the three drives can be accessed (the number of drives that cannot be accessed is up to 1) even in the case in which any one of switches 21 of the switch network is broken down. More specifically, the CPU 101 selects drives A, E, and H as the three drives that configure an LU1 (a RAID group 1) having an LU type of "2D1P" as shown in FIG. 4 for instance. Even in the case in which any one of switches 21 of the switch network is broken down, at least two of the drives A, E, and H can be accessed.

FIG. 4 shows the case in which the number of the storage control devices 10 is at least 2. In this case, a node management table and an LU management table, which will be described later, are shared with at least two storage control devices 10. For instance, in the case in which a storage control device 10 is added, a node management table and an LU management table are transmitted from any one of the present storage control devices 10 to the added storage control device 10. Moreover, in the case in which a node management table and an LU management table are updated for any one of the storage control devices 10, a storage control device 10 that is provided with the updated tables transmits the update information that indicates the updated tables (for instance, the element information before update and an information element after update for tables) to all other storage control devices 10, and each of the other storage control devices 10 updates a table that the storage control device 10 holds based on the received update information. By the above configuration, a node management table and an LU management table can be updated by a plurality of storage control devices 10. As substitute for the above method, at least one of a node management table and an LU management table is stored into a shared storage area that can be accessed by a plurality of storage control devices 10, and each of the storage control devices 10 can refer to or update the table as needed.

Moreover, it is preferable that the coupling between nodes is configured in such a manner that any storage control device 10 can access any drive. However, from a certain point of view (for instance, from a security point of view), a coupling configuration in which a certain storage control device cannot access a certain drive can also be adopted.

Figure 5:
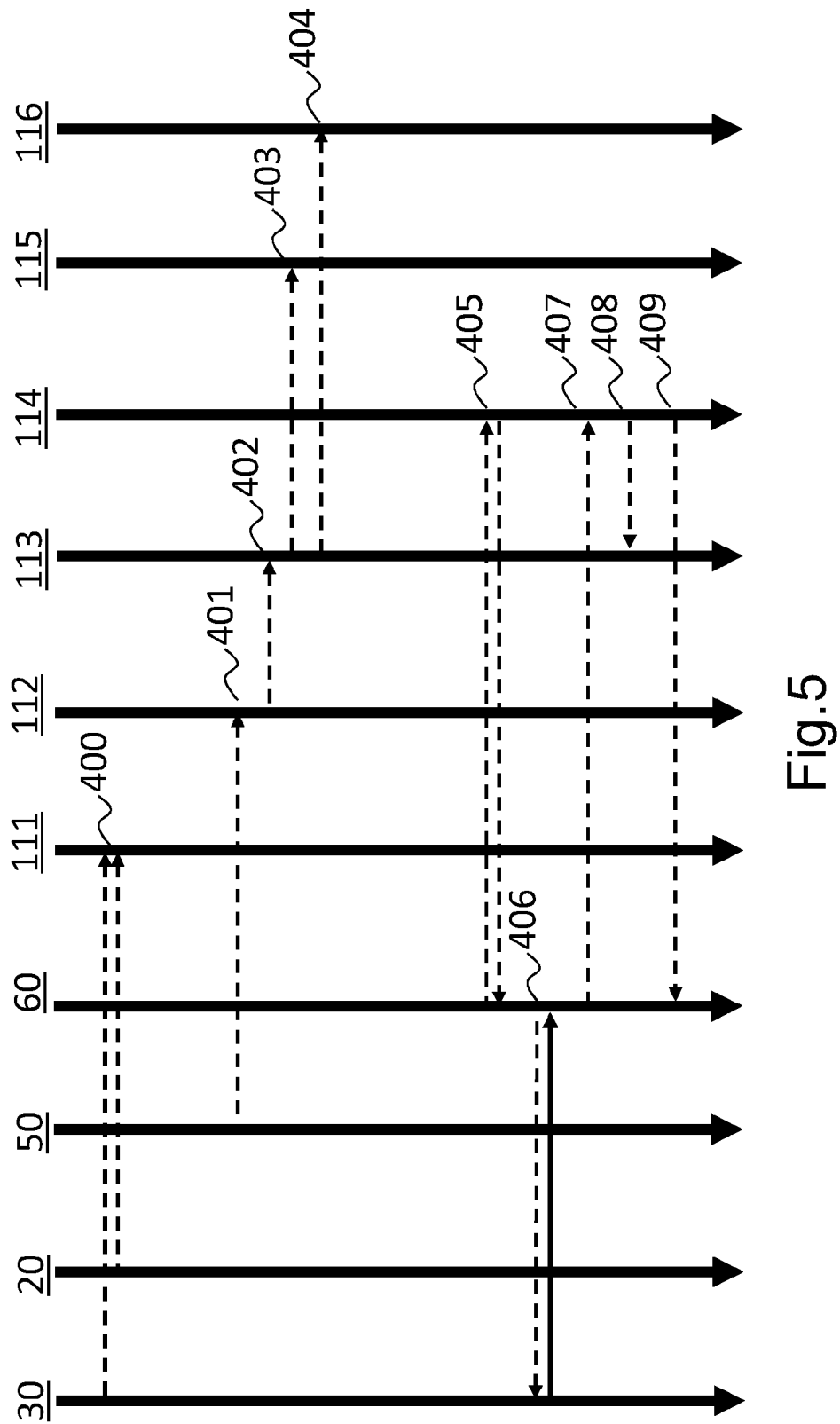
FIG. 5 shows a total operation sequence in accordance with an embodiment of the present invention.

FIG. 5 shows a total operation sequence in accordance with an embodiment of the present invention.

(Step 400) A node management program 111 of the storage control device 10 acquires the device information from a drive or a switch. To acquire the device information, an existing protocol such as an SNMP (Simple Network Management Protocol) can be used. The device information includes a name of a parent node, a name of a child node, an MTBF (Mean Time Between Failure), an operating time (an accumulated total time length of an operation), network information, and device information for instance.

(Step 401) After the device information is collected from a drive or a switch to the storage control device 10, a management terminal 50 transmits an indication for newly building an LU to the storage control device 10. The indication includes the requirement information that indicates the conditions of an LU type and so on.

(Step 402) A configuration program 112 in the storage control device 10 notifies the LU management program 113 of the requirement information that is specified by the indication received from the management terminal 50.

(Step 403) The LU management program 113 judges whether or not a redundancy (a drive group) that satisfies the requirement indicated by the requirement information is acquired by using a redundancy calculation program 115.

(Step 404) In the case in which it is judged that the requirement can be satisfied, the LU management program 113 generates an LU by using an LU build program 116, that is to say, the LU management program 113 builds a RAID group and an LU on the RAID group.

The LU that has been built by the above steps 401 to 404 can be accessed from the host 60. For instance, the storage control device 10 provides the information related to the built LU (for instance, a LUN (Logical Unit Number)) to the host 60. By the configuration, the host 60 can recognize an LU that can be accessed.

For instance, an access (a host I/O processing) from the host 60 to an LU is executed in the flow of the following steps 405 to 409.

(Step 405) The host 60 transmits an I/O request (a write request or a read request) that specifies the I/O destination (for instance, a LUN and an LBA (Logical Block Address)) to the storage control device 10. An I/O control program 114 in the storage control device 10 then transmits a drive address (an address of a drive and a storage space of the drive) that is corresponded to the I/O destination that has been specified by the I/O request to the host 60.

(Step 406) The host 60 executes an I/O (a write or a read) of data to an area (an area in the drive) that is indicated by the notified drive address.

By the above method in which the host 60 executes an I/O of data to a drive directly, a burden of the storage control device 10 can be reduced. However, to achieve the above object, it is necessary that the host 60 has a function to access directly to a drive.

(Step 407) The host 60 notifies the storage control device 10 of the I/O result information related to a success or a failure of an I/O. In the case of a success of an I/O, the host I/O processing is terminated in the step 407.

(Step 408) In the case of a failure of an I/O, an I/O control program 114 in the storage control device 10 notifies the LU management program 113 of a breakdown for a drive of the I/O destination from the host 60. The I/O control program 114 makes a rebuild of an LU to be executed as needed.

(Step 409) The I/O control program 114 notifies the host 60 of a drive address of an alternative access destination (a drive address as substitute for a drive address that has been notified in the step 405).

As a procedure of the host I/O processing, a procedure other than the above procedure can also be adopted. For instance, in the step 405, as substitute for notifying the host 60 of a drive address of an I/O destination, the I/O control program 114 can also execute an I/O directly to the drive. More specifically, the I/O control program 114 can read data via the switch network from an area (an area in the drive) that is indicated by a drive address that is corresponded to the I/O destination that is specified by a read request from the host 60, and can transmit the read data to the host 60 for instance. Or more specifically, the I/O control program 114 can write data that complies with a write request from the host 60 via the switch network to an area (an area in the drive) that is indicated by a drive address that is corresponded to the I/O destination that is specified by the write request. In this case, a procedure of notifying the I/O control program 114 from the host 60 of a success or a failure of an I/O (step 407) and a procedure of notifying the host 60 of an alternative access destination (step 409) are not necessary, thereby improving a compatibility of the host.

Figure 6:
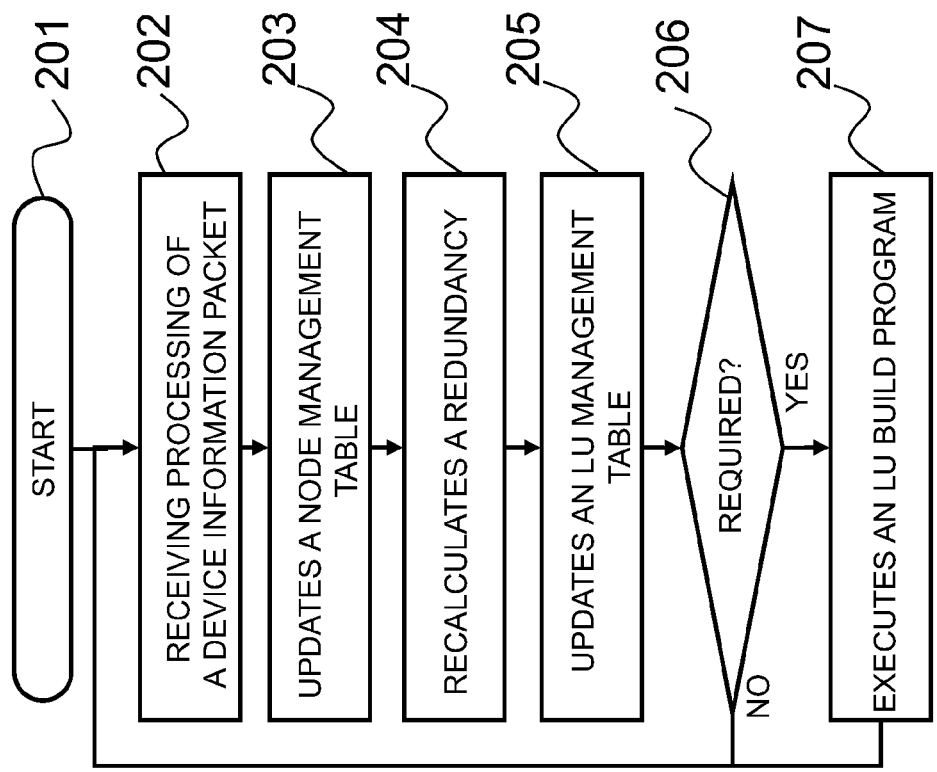
FIG. 6 is a view showing an operation algorithm of the node management program 111.

FIG. 6 is a view showing an operation algorithm of the node management program 111.

The node management program 111 is a program for collecting and holding the latest device information of a drive and the switch 21. The node management program 111 is started on an occasion of the power ON of the storage control device 10 (step 201).

The node management program 111 waits an arrival of the device information from a drive and the switch 21 (step 202). More specifically, the node management program 111 issues a query of the device information and waits the device information from a node (a drive and the switch 21) that has received the query.

In the case in which the node management program 111 receives the device information, the node management program 111 updates (or creates) a node management table, which will be described later, based on the device information (step 203).

The node management program 111 then calls a redundancy calculation program 115, which will be described later, and executes a recalculation of a redundancy based on the updated node management table (step 204).

The node management program 111 updates the redundancy information of an LU management table, which will be described later, based on the calculation results of the step 204 (step 205).

The node management program 111 judges whether an LU rebuild is required or not (step 206). More specifically, the node management program 111 judges whether a redundancy has been changed or not due to the update of the step 205.

In the case in which the node management program 111 decides that there is an LU that requires an LU rebuild, the node management program 111 calls an LU build program 116 (step 207).

The node management program 111 repeats (for instance, periodically executes) the processing of the above steps 202 to 207 during the period when the storage control device 10 is operated. By this configuration, the latest device information can be acquired from a drive and the switch 21, and the node management table and the LU management table are updated to be in the latest state.

FIG. 7 is a view showing the configuration of a node management table 300.

The node management table 300 is provided with the information related to a node for every node. More specifically, the node management table 300 is provided with a management number 301 for identifying a node, a management number 302 of a parent node of a node, a node name 303, an MTBF 304, an operating time 305, the network information 306, and a device state 307 for indicating a state of a node (for instance, normal or faulty) for every node. The network information 306 is a round trip time (RTT) that includes a delay caused by a node on a path and that is a time taken for a communication between the storage control device 10 and a node for instance. However, the network information 306 can also be a delay time in each node in the case in which a node transfers a packet or in the case in which a node executes an I/O in place of the RTT. In this case, in the process that will be executed later in which an RTT of a specific node is referred to, instead of referring to the RTT in the network information 306, the total sum of a delay time of a node that exists on a path between the control device 10 and the node and a delay time of the node is calculated as a substitute for an RTT. In the case in which the device information is received from a node for instance, the device information (such as a node name and an MTBF), a management number of the newly added node, and a management number of a parent node of the node are recorded to the record of the node management table 300. The information included in the node management table 300 can also be managed in a format other than a table.

By the node management table 300 of FIG. 7, it is found that a switch of a management number 1 is coupled with the storage control device 10, and a drive of a management number 2 is coupled with the switch of the management number 1. Moreover, by the node management table 300 of FIG. 7, it is found that the operating time 305 is shorter than the MTBF 304 and the device state 307 is normal for every node, whereby there is no node that requires an exchange.

The node management program 111 can regard a node in which a difference between the MTBF 304 and the operating time 305 (for instance, the MTBF 304 is longer than the operating time 305) is less than the prescribed threshold value as a faulty node and can rebuild an LU. By this configuration, it can be expected that reliability is improved.

Moreover, the node management program 111 can select a plurality of drives having the same round trip time as a plurality of drives that configure one LU (one RAID group) (here, the meaning of "the same" can include that a difference between round trip times is up to the prescribed value). In the case in which an LU is configured by drives having the same response performance, it is expected that the quality of images can be prevented from being deteriorated for a distribution of images from an LU for instance.

As described before, the node management table 300 can be shared with a plurality of storage control devices 10. By this configuration, a spare free drive for being assigned when a drive is broken down can be shared with a plurality of storage control devices 10. In the case in which a free drive is shared, it is expected that the number of spare free drives can be reduced, whereby a cost can be reduced, as compared with the case in which the dedicated spare free drive is assigned to each of a plurality of storage control devices 10.

The node management table 300 is stored into the memory 103 for instance. In the case in which there is a plurality of storage control devices 10, the node management table 300 can be stored into a shared area of the storage control devices 10.

Figure 8:
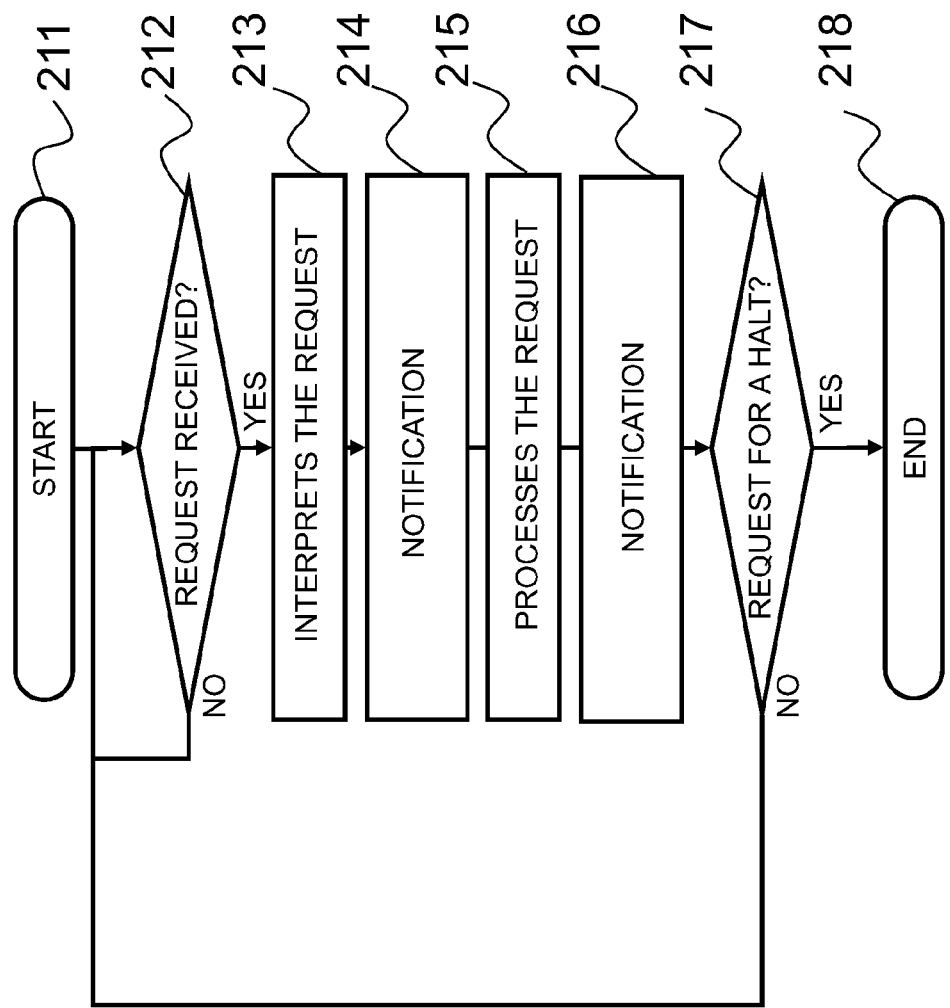
FIG. 8 is a view showing an operation algorithm of the configuration program 112.

FIG. 8 is a view showing an operation algorithm of the configuration program 112.

The configuration program 112 is a program that receives an indication for newly building an LU from a management terminal 50 to newly build an LU. The configuration program 112 is executed on an occasion of the activation of the storage control device 10 (step 211).

The configuration program 112 waits a reception of a request from the management terminal 50 (step 212).

In the case in which the configuration program 112 receives a request (step 212: YES), the configuration program 112 interprets the request (step 213). The configuration program 112 then notifies other storage control devices 10 of starting a request processing (a processing of a request that has been received) as needed (for instance, in the case in which there are a plurality of storage control devices 10) (step 214). This notification is required for executing an exclusive control such as the case in which an LU is newly built under the condition that a storage control device 10 in which the configuration program 112 is executed shares a free drive on the switch network with other storage control device 10. The other storage control devices 10 that have received the notification cannot access a drive. That is to say, by the above notification, an exclusive control is started.

Figure 9:
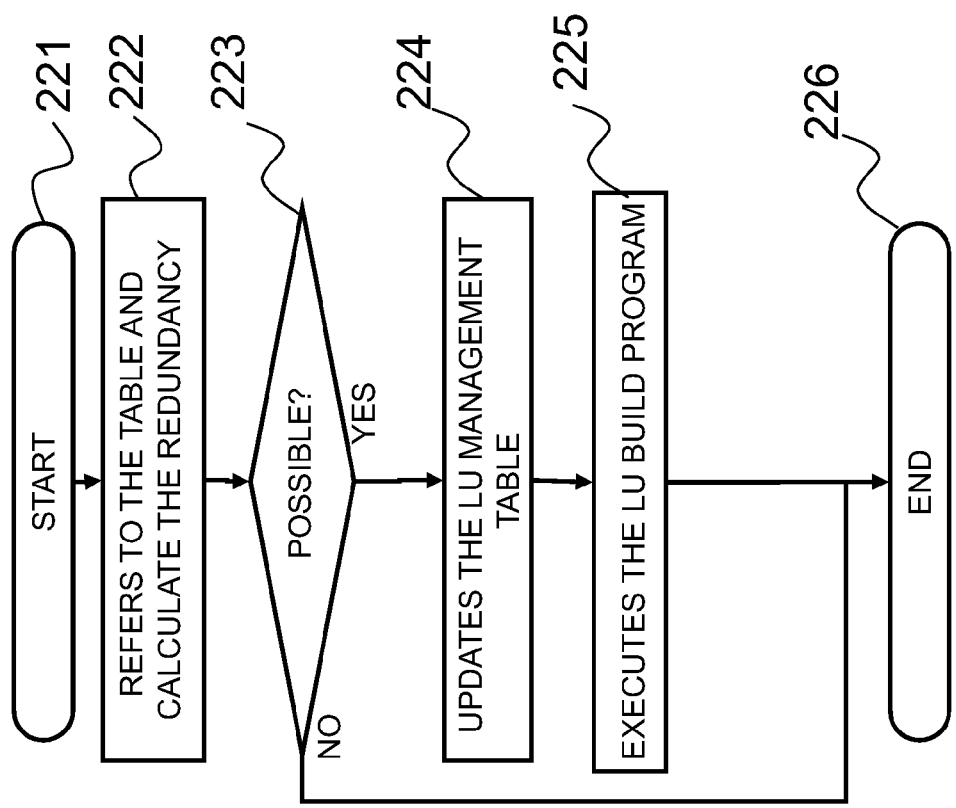
FIG. 9 is a view showing an operation algorithm of the LU management program 113.

The configuration program 112 processes the request that has been received (step 215). In the case in which the request is for newly building an LU for instance, the configuration program 112 calls an LU management program 113 (step 402 of FIG. 5). By this action, the processing of FIG. 9 is executed.

After that, the configuration program 112 notifies other storage control devices 10 of a completion of the request processing again as needed (step 216). The other storage control devices 10 that have received the notification can access a drive. That is to say, by the above notification, an exclusive control is terminated.

In the case in which a request that has been received after the step 216 is a request for a halt to a storage control device 10 that is executing the configuration program 112 (step 217: YES), the configuration program 112 stops the storage control device 10 (step 218).

A request that is processed by the configuration program 112 can be a wide variety of requests such as a deletion of an LU, a data replication between LUs, and a transmission of statistical information of many kinds, in addition to a newly building of an LU and a stop of the storage control device 10 as described above.

FIG. 9 is a view showing an operation algorithm of the LU management program 113.

The LU management program 113 is a program for managing an LU management table 310 that will be described later. The LU management program 113 is called on an occasion of a building of an LU, such as the case in which the configuration program 112 receives an LU building request (step 221). For instance, the LU building request includes the requirement information, and the requirement information includes an LU type (for instance, a drive redundancy).

At first, the LU management program 113 reads a node management table 300 and an LU management table 310, and specifies an unused drive among a plurality of drives that are coupled with the switch network (step 222).

The LU management program 113 then judges whether or not there is a combination of drives that satisfy the conditions (such as a drive redundancy and a path redundancy) that are specified from the LU building request among at least one unused drive that has been specified by using a redundancy calculation program 115 that will be described later (step 223).

In the case in which it is decided that there is a combination of drives that satisfy the conditions (step 223: YES), the LU management program 113 updates the LU management table (step 224) and executes an LU build program 116 that will be described later (step 225). In the case in which it is decided that there is not a combination of drives that satisfy the conditions (step 223: NO), the LU management program 113 is terminated (step 226).

FIG. 10 is a view showing the configuration of an LU management table 310.

The LU management table 310 is provided with the information related to an LU for every LU. More specifically, the LU management table 310 is provided with an LU number (LUN) 311 for identifying an LU, an LU type 312 (for instance, a RAID level), a capacity 313, a list 314 of names of drives that configure an LU, a drive redundancy 315, and a path redundancy 316 for every LU.

The drive redundancy 315 indicates the maximum number of drives in which a breakdown is permitted among drives that configure an LU and the number of drives that are broken down at the moment.

The path redundancy 316 indicates the maximum number of switches in which a breakdown is permitted among switches that are disposed between the storage control device 10 and each of drives that configure an LU and the number of switches that are broken down at the moment.

The information included in the LU management table 310 can also be managed in a format other than a table.

By the LU management table 310 of FIG. 10, it is found that an LU of an LU number 0 has a RAID5 configuration in which two of three drives are used for storing user data and one of the three drives is used for storing parity data, and the maximum number of drives in which a breakdown is permitted 1.

Moreover, by the LU management table 310 of FIG. 10, it is found that an LU of an LU number 1 has a RAID6 configuration in which a redundancy is required to be automatically recovered immediately in the case in which a drive is broken down, two of four drives are used for storing user data and two of the four drives are used for storing parity data, and the maximum number of drives in which a breakdown is permitted 2.

Moreover, by the LU management table 310 of FIG. 10, it is found that an LU of an LU number 2 has a RAID5 configuration in which two of three drives are used for storing user data and one of the three drives is used for storing parity data.

Moreover, it is found that each of drives that configure an LU can be accessed from the storage control device 10 even in the case in which one switch is broken down. In other words, it is found that the maximum number of drives in which a breakdown is permitted 1, and the maximum number of switches in which a breakdown is permitted 1.

The LU management table 310 is stored into the memory 103 for instance. In the case in which there is a plurality of storage control devices 10, the LU management table 310 can be stored into a shared area of the storage control devices 10.

Figure 11:
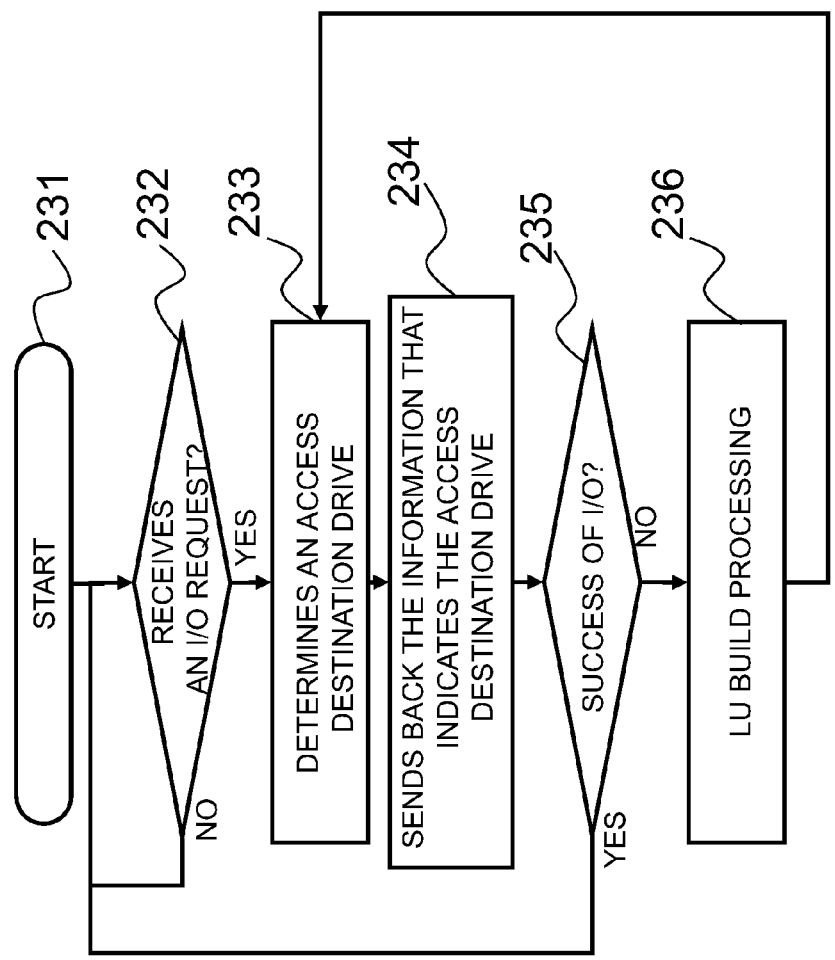
FIG. 11 is a view showing an operation algorithm of the I/O control program 114.

FIG. 11 is a view showing an operation algorithm of the I/O control program 114.

The I/O control program 114 is a program for processing an I/O request transmitted from the host 60, and is started on an occasion of the activation of the storage control device 10 (step 231).

The I/O control program 114 waits an I/O request transmitted from the host 60 (step 232).

In the case in which the I/O control program 114 receives an I/O request (step 232: YES), the I/O control program 114 refers to the LU management table 310 and specifies an access destination drive that configures an LU that is specified by the I/O request (I/O destination LU) (step 233). The access destination drive that has been specified is a drive group that is indicated by a used drive 314 corresponded to the I/O destination LU in the LU management table 310.

The I/O control program 114 sends back the information that indicates the access destination drive that has been specified to the host 60 (step 234). The host 60 can access a drive that is indicated by the access destination drive information via the storage control device 10.

The I/O control program 114 waits a notification of a success or a failure of an I/O from the host 60 (step 235).

In the case in which the I/O control program 114 receives a notification of a success of I/O or an unrecoverable fatal error from the host 60 (step 235: YES), the I/O control program 114 waits a reception of the next request.

On the other hand, in the case in which the I/O control program 114 receives a notification of a failure of I/O (step 235: NO), the I/O control program 114 executes the LU build program to recover an LU as needed (step 236), and executes the procedures from the step 233 again. Here, "as needed" means the case in which disks of the number equivalent to the breakdown permitted maximum number of disks for an LU are broken down among a plurality of disks that configure the LU of the I/O destination associated with a failure of I/O and an LU cannot be accessed in the case in which a failure of I/O occurs for an arbitrary disk that configures the LU for instance. Or else, it can also means the case in which a ratio or a difference between the breakdown permitted maximum number of disks and the number of broken disks exceeds a certain threshold value and an LU cannot be accessed in the case in which a failure of I/O occurs for a small number of a plurality of disks that configure the LU.

Figure 12:
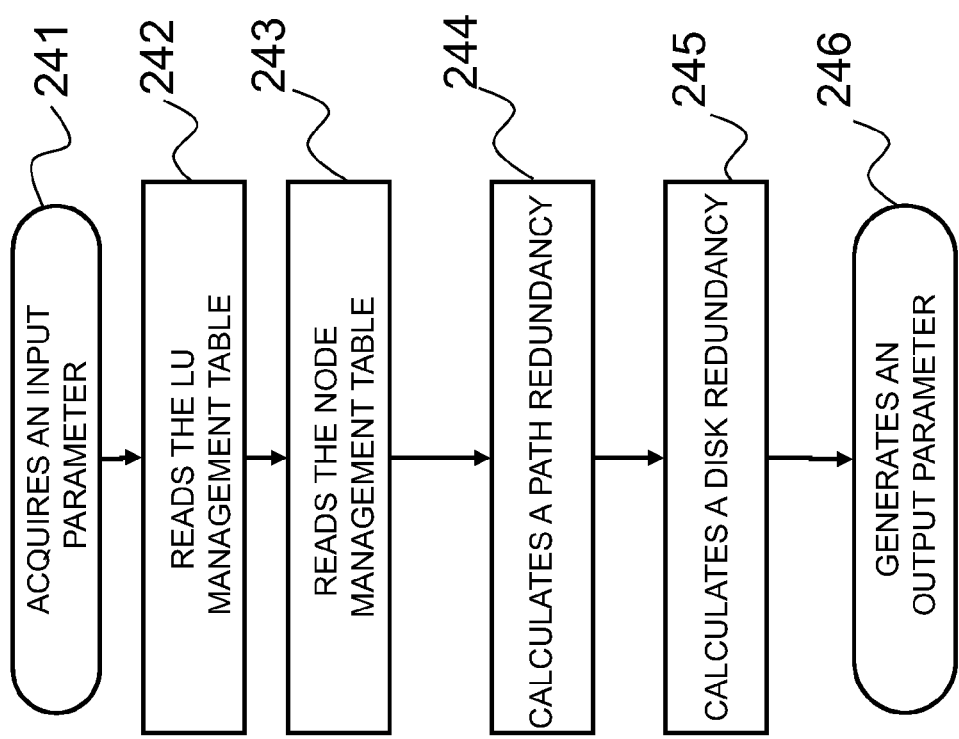
FIG. 12 is a view showing an operation algorithm of the redundancy calculation program 115.

FIG. 12 is a view showing an operation algorithm of the redundancy calculation program 115.

The redundancy calculation program 115 is a program for updating a drive redundancy 315 and a path redundancy 316 of the LU management table 310, and is executed by acquiring an input parameter 320 that will described later from the LU management program 113. When the program is terminated, the redundancy calculation program 115 outputs an output parameter 330 that will described later.

In the case in which the execution of the redundancy calculation program 115 is started, the redundancy calculation program 115 reads an input parameter 320 (step 241). The redundancy calculation program 115 then reads the LU management table 310 (step 242), and reads the node management table 300 (step 243).

The redundancy calculation program 115 then executes a calculation of a path redundancy (step 244), and executes a calculation of a drive redundancy (step 245). The redundancy calculation program 115 then generates an output parameter 330 to be terminated (step 246).

FIG. 13 is a view for indicating the contents of the input parameter 320 to the redundancy calculation program 115.

The input parameter 320 includes an LU number 311, an LU type 312, and a used drive 314, and is a list of an LU for which a redundancy is to be calculated.

In the case in which an LU number 311 is the number of an LU that has been defined (an LU number that has been registered to the LU management table 310), a redundancy (a drive redundancy and a path redundancy) of an LU that has been defined (an existing LU) is calculated. On the other hand, in the case in which an LU number 311 is the number of an LU that has not been defined (an LU number that has not been registered to the LU management table 310), a redundancy of an LU that is to be newly built is calculated.

Figure 14:
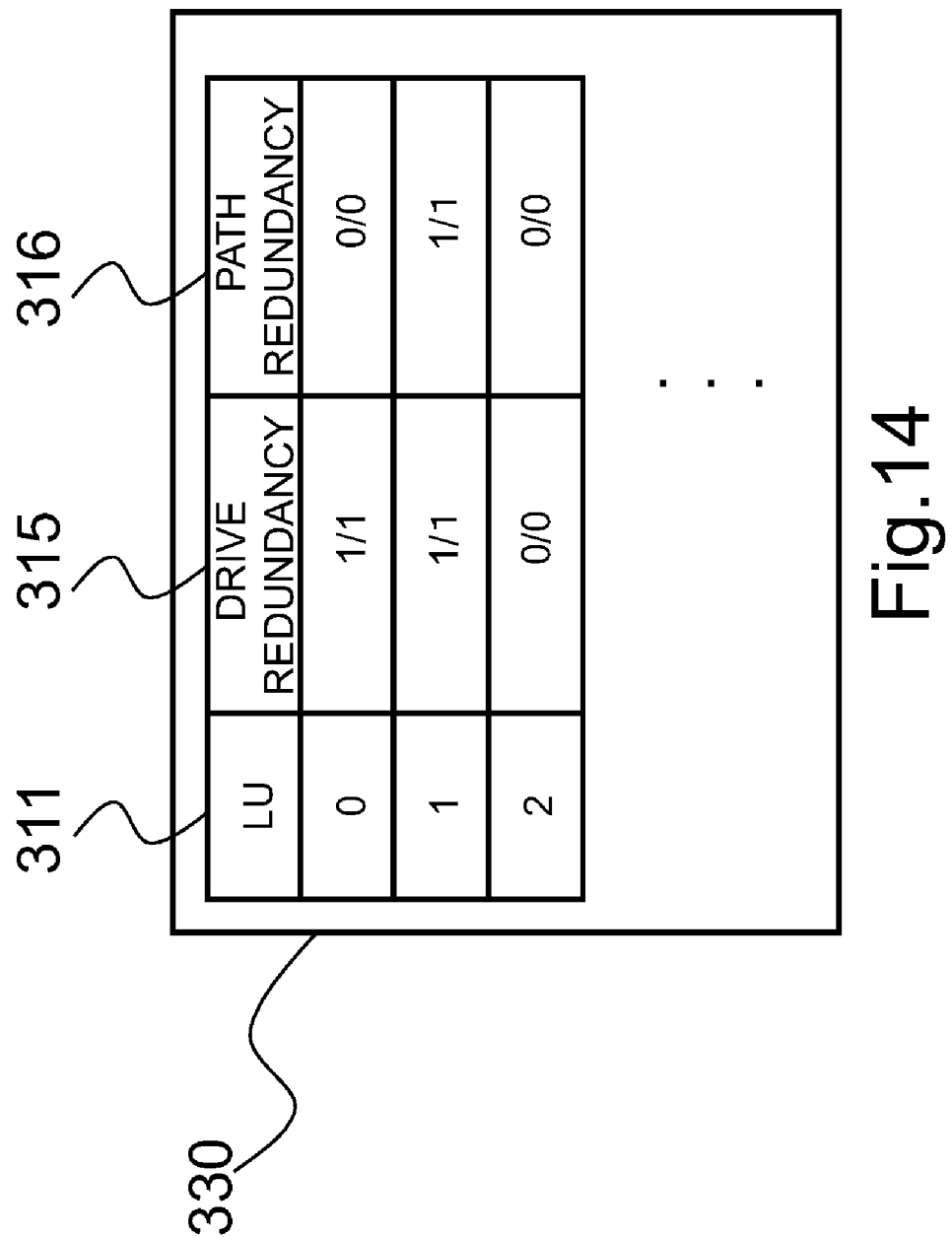
FIG. 14 is a view for indicating the contents of the output parameter 330 to the redundancy calculation program 115.

FIG. 14 is a view for indicating the contents of the output parameter 330 to the redundancy calculation program 115.

The output parameter 330 includes an LU number 311, a drive redundancy 315, and a path redundancy 316, and is a list of the redundancy calculation results of each LU. More specifically, although the input parameter 320 of FIG. 13 has "0", "1", and "new" as an LU number 311, the output parameter 330 includes a drive redundancy 315 and a path redundancy 316 for each of the three LU numbers. In the case in which the LU number 311 is "new" for the input parameter 320, a newly given LU number 2 is included in the output parameter 330.

The redundancy calculation program 115 can calculate a drive redundancy 315 of one LU (hereafter referred to as a target LU in this paragraph) as described in the following for instance. More specifically, the redundancy calculation program 115 can specify the maximum number of drives in which a breakdown is permitted from an LU type in the input parameter 320. Moreover, the redundancy calculation program 115 refers to the node management table 300, specifies a device state of each drive that configures a target LU, and sets a value obtained by subtracting a number equivalent to the number of drives that are broken down from the breakdown permitted maximum number of drives as the current redundancy.

The redundancy calculation program 115 can calculate a path redundancy 316 of one LU (hereafter referred to as a target LU in this paragraph) as described in the following for instance. That is to say, the redundancy calculation program 115 refers to the node management table 300, and specifies each path coupling each drive that configures a target LU with the storage control device 10. The redundancy calculation program 115 calculates the breakdown permitted maximum number of switches based on the breakdown permitted maximum number of drives for the target LU and the each specified path. More specifically, in the case in which the number of drives that configures a target LU is N (N is an integer number of at least 2) and the breakdown permitted maximum number of drives for the target LU is M (M is an integer number) for instance and in the case in which at least (N−M) drives can be accessed even if the maximum K switches (K is an integer number) are broken down, the breakdown permitted maximum number of switches is set to K. Moreover, the redundancy calculation program 115 refers to the node management table 300, and sets a value obtained by subtracting 1 from the breakdown permitted maximum number of switches as the current redundancy in the case in which there is a drive that cannot be accessed due to a breakdown of a switch among a drive group that configures the target LU for instance.

Figure 15:
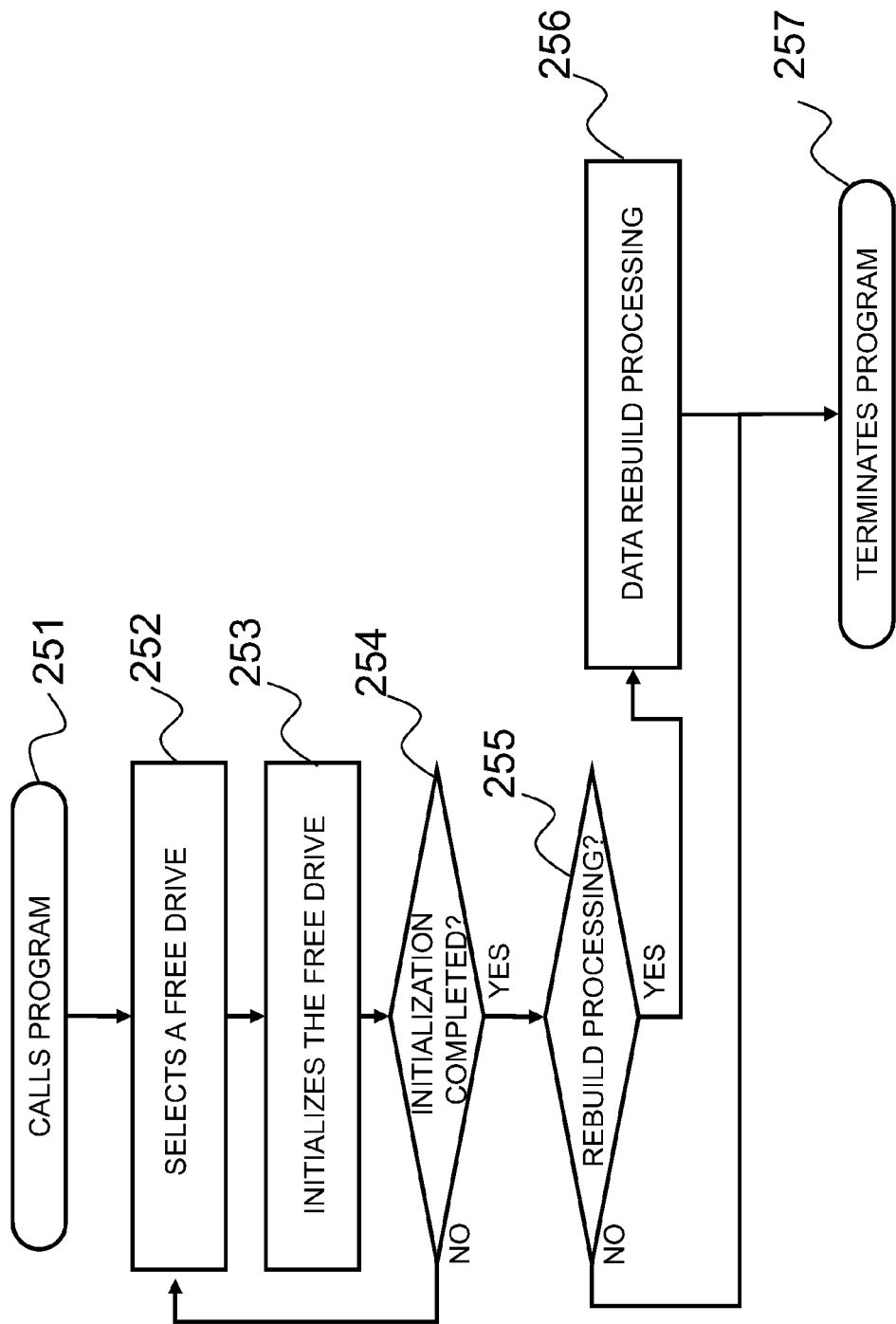
FIG. 15 is a view showing an operation algorithm of the LU build program 116.

FIG. 15 is a view showing an operation algorithm of the LU build program 116.

The LU build program 116 is a program for building an LU, and is started by being called from the LU management program 113 or the like (step 251).

At first, the LU build program 116 refers to the LU management table 310 and the node management table 300, and selects a free drive that is not being used and that is uninitialized among drives that configure the target LU (step 252) to initialize the free drive (step 253).

In the case in which an LU is newly built, the above procedures are repeated until all drives are initialized. In the case in which an LU is rebuilt, the above procedures are repeated until an initialization of newly added drives is completed (step 254).

In the case in which an LU is newly built, the LU build program 116 is terminated at the above step (step 257).

On the other hand, in the case in which an LU is rebuilt (step 255), the LU build program 116 executes a data rebuild processing (step 256). More specifically, since a drive D of the drives A to D that configure an LU0 of the RAID5 is broken down, a free drive (a spare drive) E is specified as a configuration element of the LU0 in place of the drive D. In this case, the LU build program 116 recovers data in the drive D by using data in the drives A to C and writes the recovered data to the drive E as the data rebuild processing.

While one preferred embodiment in accordance with the present invention has been described above, the present invention is not restricted to the embodiment obviously, and various changes, modifications, and functional additions can be thus made without departing from the scope of the present invention.

For instance, the host 60 can transmits an indication for newly building an LU to the storage control device 10 in place of the management terminal 50.

Moreover, for instance, the storage control device 10 can be configured by one or a plurality of computers.

Moreover, for instance, the node management program 111 can detect an addition, a modification (for instance, a modification of a state from a normal state to a faulty state), or a deletion of a node. In the case in which the node management program 111 detects one of them, the node management program 111 can acquire the device information from a node that has been added or a node of which configuration has been modified, and can update the node management table 203. Moreover, the node management program 111 can execute the processing starting with the step 204 of FIG. 6.

Figure 16:
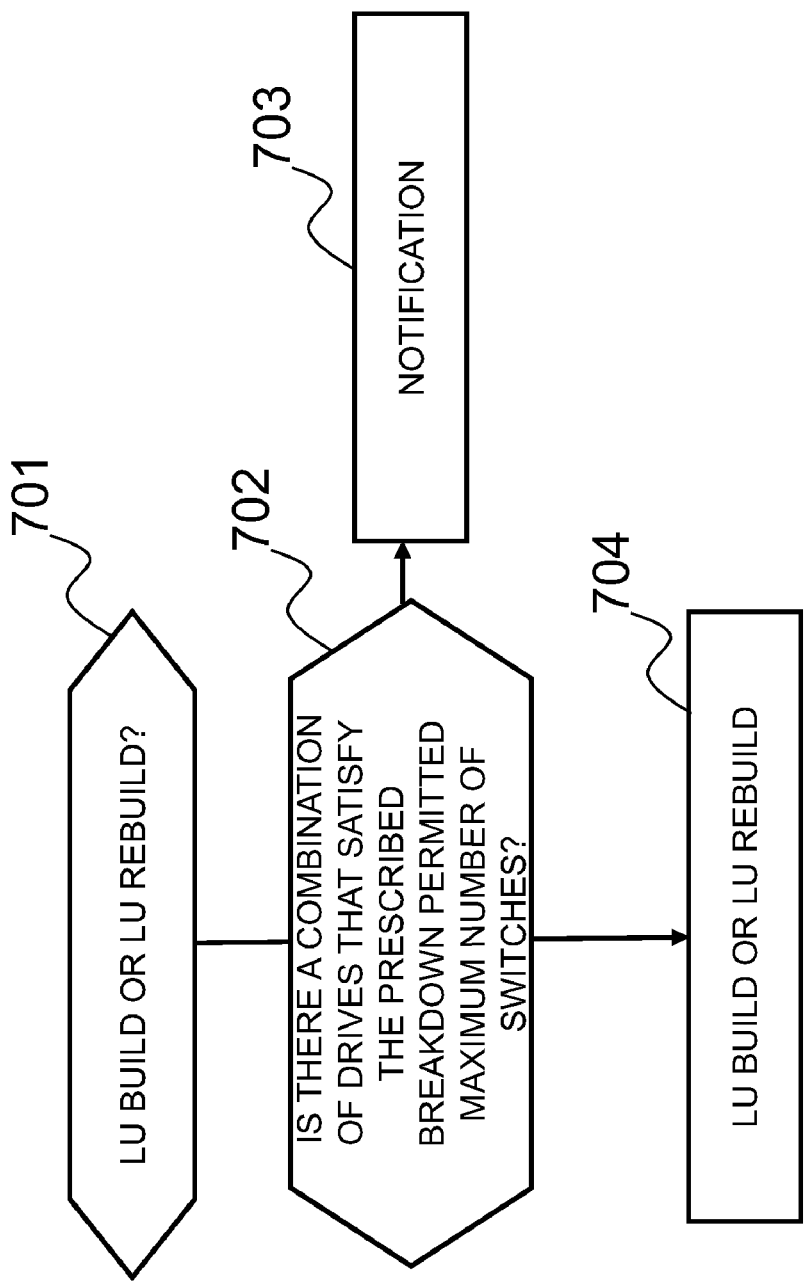
FIG. 16 is a view showing a flow of a processing that is executed in a modification example in accordance with an embodiment of the present invention.

Moreover, as shown in Fig. 16 for instance, in the case of an LU building or an LU rebuilding (step 701: YES), the CPU 101 of the storage control device 10 judges whether or not there is a combination of unused drives that satisfy the prescribed breakdown permitted maximum number of switches based on an LU type (the breakdown permitted maximum number of drives) of a target LU for which a build or a rebuild is to be executed and a path between the storage control device 10 and each of the unused drives (step 703). In the case in which it is decided that there is the combination, the CPU 101 builds or rebuilds the target LU. On the other hand, in the case in which it is decided that there is not the combination, the CPU 101 notifies the management terminal 50 of that there is not a combination of unused drives that satisfy the prescribed breakdown permitted maximum number maximum number of switches. The management terminal 50 displays that there is not a combination of unused drives that satisfy the prescribed breakdown permitted maximum number of switches. An administrator sees the display and judges whether or not an LU building or an LU rebuilding is executed by a combination of unused drives that do not satisfy the breakdown permitted maximum number of switches. In the case in which the administrator has decided that an LU building or an LU rebuilding is executed by a combination of unused drives that do not satisfy the breakdown permitted maximum number of switches, the administrator can take an action of modifying the LU type of an LU to be built or rebuilt (for instance, modifying to the LU type having larger breakdown permitted maximum number of drives). In the step 703, the CPU 101 searches a combination of unused drives (X unused drives) that satisfy the following condition (C1) for instance:

(C1): each of at least Z drives can be accessed among X drives (X is an integer number of at least 2) that configure the target LU even in the case in which switches of the breakdown permitted maximum number W (W is an integer number of at least 1) of switches are broken down.

Here, Z is a difference between X and the breakdown permitted maximum number Y (Y is an integer number, Y is less than X) of drives for the target LU. Moreover, "the prescribed breakdown permitted maximum number of switches" can be the number of switches that has been previously determined or can be the number of switches that has been specified by the management terminal 50.

The above combination can be found by checking whether or not at least Z drives can be accessed through switches other than the W switches even in the case in which the W switches on a plurality of paths are broken down for every candidate combination of unused drives (X unused drives) for instance.

In the case in which drives of the number equivalent to the breakdown permitted maximum number of drives are broken down (or switches of the number equivalent to the breakdown permitted maximum number of switches are broken down) for instance, the CPU 101 can rebuild an LU. In this case, a spare drive (an unused drive) as substitute for a drive (for instance, a faulty drive or a drive that cannot be accessed in the case in which a switch is further broken down) can be a configuration element of the LU. At this time, a spare drive that satisfies the above condition (C1) can be determined among a plurality of spare drives.

Moreover, in the case in which a combination that satisfies the above condition (C1) cannot be found for instance, the CPU 101 can specify an addition of a switch between nodes resulting in a combination that satisfies the above condition (C1) based on a tree structure that is specified by the node management table 300, and can transmit the information that indicates an addition of a switch between nodes resulting in a combination that satisfies the above condition (C1) to the management terminal 50.

Moreover, in the step 703, the CPU 101 can search on a preferential basis the above combination of unused drives satisfying the following conditions (C2) and/or (C3) ((C2) can have a priority over (C3)):

(C2): a response performance (for instance, a round trip time) from a drive to the storage control device 10 is the same; and (C3): a leftover lifetime (for instance, a difference between MTBF and an operating time) is the same.

In the case in which such a combination cannot be found, the CPU 101 can search a combination of unused drives satisfying at least the condition (C1). Here, "the same" does not require a strict conformance, and a value (a response performance or a leftover lifetime) can vary in a certain range for instance. The leftover lifetime can be a means other than a difference between MTBF and an operating time, for instance, can be a difference between the number of erasures for a flash memory and a prescribed threshold value in the case in which a drive is a flash memory.

Moreover, the host 60 can directly access a drive without being routed through the storage control device 10. In this case, the host 60 is coupled with at least one switch 21 of the switch network. A root node of a path to each drive is not the storage control device 10 but the host 60. This is because a drive is accessed from the host 60 via the switch network.

[Reference Signs List]

10: Storage control device

The invention claimed is:

1. A storage control device comprising:
an interface device coupled to at least one switch of a switch network that is configured by a plurality of switches that transfer a packet that complies with an IP (internet Protocol); and
a controller coupled to the interface device,
wherein a plurality of storage devices are coupled to at least two switches of the switch network,
wherein the controller builds an LU (Logical Unit) that is utilized by a host device based on at least two storage devices that are coupled with different switches,
wherein the controller acquires device information from each of a plurality of nodes, the plurality of nodes including the plurality of switches and the plurality of storage devices,
wherein the device information of each node includes information indicating which of the other nodes of the plurality of nodes is coupled to the node and information indicating whether each of the other nodes of the plurality of nodes is normal or not,
wherein the controller builds node management information, the node management information including the information indicating which of the other nodes of the plurality of nodes is coupled to each node, based on the device information from each of the plurality of nodes,
(a) the controller searches X (X is equal to or greater than an integer number of 2) storage devices that satisfy the following condition (C1), based on the following (e1) and (e2):
(e1) each path is a path to each storage device via at least one switch and is specified based on the node management information;
(e2) a maximum number Y (Y is an integer number, Y is less than X) of storage devices that can break down, wherein all data stored in the storage devices can be restored when Y devices break down,
(C1) each of at least Z storage devices can be accessed among X storage devices that configure an LU even when W (W is equal to or larger than an integer number of 1) switches are broken down, the W is a maximum number of switches in which a breakdown is permitted, the Z is a difference between the X and the Y for the LU,
(b) the controller builds an LU based on the found X storage devices,
(c) the controller executes an LU rebuild processing on a prescribed occasion,
wherein the prescribed occasion is when the device information is received from any one of the nodes, storage devices of the number equivalent to the X are broken down, or switches of the number equivalent to the W are broken down,
wherein LU rebuild processing is a processing in which an unused storage device, in place of a specific storage device of the X storage devices, is a member of the X storage devices based on the LU in such a manner that the condition (C1) is satisfied, and wherein the specific storage device is a faulty storage device or a storage device that cannot be accessed in the case in which a switch is further broken down.

2. The storage control device according to claim 1,
wherein the interface device receives an I/O (Input/Output) request that assigns an LU from the host device, and
wherein the controller executes the processes of:
(p) specifying a storage device that is a basis of the LU that is assigned by the I/O request;
(q) notifying the host device of an address of the specified storage device;
(r) receiving I/O result information related to a success or a failure of the I/O to the storage device that is indicated by the notified address from the host device; and
(s) executing the LU rebuild processing for the LU that is assigned by the I/O request in the case in which the I/O result information indicates a failure of the I/O.

3. The storage control device according to claim 2,
wherein the device information that is acquired from a storage device includes an MTBF (Mean Time Between Failure) and an operating time, and
wherein the controller executes the LU rebuild processing for the LU based on the storage device, and
wherein a difference between the MTBF and the operating time is less than the prescribed threshold value in the storage device.

4. A storage control device comprising:
an interface device coupled to at least one switch of a switch network that is configured by a plurality of switches that transfer a packet that complies with an IP (internet Protocol); and
a controller coupled to the interface device,
wherein a plurality of storage devices are coupled to at least two switches of the switch network,
a plurality of nodes, the plurality of nodes including the plurality of switches and the plurality of storage devices,
wherein the controller builds an LU (Logical Unit) that is utilized by a host device based on at least two storage devices that are coupled with different switches,
wherein the controller is provided with node management information, the node management information including information indicating which of the other nodes of the plurality of nodes is coupled to each node,
wherein the controller calculates a number W (W is equal to or larger than an integer number of 1) of switches for the LU based on a configuration of the path to each of the at least two storage devices, and
wherein the W is the maximum number of switches in which a breakdown is permitted.

5. A storage control device comprising:
an interface device coupled to at least one switch of a switch network that is configured by a plurality of switches that transfer a packet that complies with an IP (Internet Protocol); and
a controller coupled to the interface device,
wherein a plurality or storage devices are coupled to at least two switches of the switch network,
wherein the controller builds an LU (Logical Unit) that is utilized by a host device based on at least two storage devices that are coupled with different switches,
wherein the controller searches X (X is equal to or larger than an integer number of 2) storage devices that satisfy the following condition (C1), based on the following (e1) and (e2):
(e1) each path is a path to each storage device via at least one switch and is specified based on the node management information;
(e2) a maximum number Y (Y is an integer number, Y is less than X) of storage devices that can break down, wherein all data stored in the storage devices can be restored when Y devices break down,
(C1) each of at least Z storage devices can be accessed among X storage devices that configure an LU even when W (W is equal to or larger than an integer number of 1) switches are broken down, the W is a maximum number of switches in which a breakdown is permitted, the Z is a difference between the X and the Y for the LU.

* * * * *